United States Patent
Flores et al.

(10) Patent No.: US 9,074,103 B2
(45) Date of Patent: Jul. 7, 2015

(54) AQUEOUS INK JET INK COMPOSITION

(75) Inventors: Elizabeth A. Flores, Sheffield Lake, OH (US); Robert J. Pafford, IV, North Royalton, OH (US); George E. Snow, Medina, OH (US); Deverakonda S. Sarma, Cleveland, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 164 days.

(21) Appl. No.: 13/636,783

(22) PCT Filed: Mar. 29, 2011
(Under 37 CFR 1.47)

(86) PCT No.: PCT/US2011/030279
§ 371 (c)(1),
(2), (4) Date: Mar. 1, 2013

(87) PCT Pub. No.: WO2011/123420
PCT Pub. Date: Oct. 6, 2011

(65) Prior Publication Data
US 2013/0196124 A1    Aug. 1, 2013

Related U.S. Application Data

(60) Provisional application No. 61/319,404, filed on Mar. 31, 2010.

(51) Int. Cl.
| | | |
|---|---|---|
| C08G 18/28 | (2006.01) |
| C08L 75/00 | (2006.01) |
| C09D 11/30 | (2014.01) |
| C08G 18/08 | (2006.01) |
| C08G 18/12 | (2006.01) |
| C08G 18/42 | (2006.01) |
| C08G 18/66 | (2006.01) |
| C08G 18/75 | (2006.01) |
| C09D 11/326 | (2014.01) |
| G09F 7/00 | (2006.01) |
| C09D 11/38 | (2014.01) |
| C09D 11/40 | (2014.01) |
| C09D 175/04 | (2006.01) |
| C09D 11/322 | (2014.01) |
| C08G 18/10 | (2006.01) |

(52) U.S. Cl.
CPC .......... C09D 11/30 (2013.01); *Y10T 428/2481* (2015.01); *Y10T 428/24802* (2015.01); *C09D 11/38* (2013.01); *C09D 11/40* (2013.01); *C09D 175/04* (2013.01); *C09D 11/322* (2013.01); *C08G 18/10* (2013.01); C08G 18/0823 (2013.01); C08G 18/12 (2013.01); C08G 18/4238 (2013.01); C08G 18/6659 (2013.01); C08G 18/758 (2013.01); C09D 11/326 (2013.01); G09F 7/00 (2013.01)

(58) Field of Classification Search
CPC .... C08G 18/10; C08G 18/12; C08G 18/0823; C08G 18/3228; C08L 75/04; C09D 175/04; C09D 11/322; C09D 11/40; C09D 11/38; C09J 175/04
USPC .................. 524/590, 840, 801, 839; 106/31.6
See application file for complete search history.

(56) References Cited

U.S. PATENT DOCUMENTS

| 5,696,182 | A | 12/1997 | Kashiwazaki et al. |
|---|---|---|---|
| H2113 | H | 1/2005 | Nichols et al. |
| 7,176,248 | B2 | 2/2007 | Valentini et al. |
| 2003/0184629 | A1 * | 10/2003 | Valentini et al. .............. 347/100 |
| 2004/0085419 | A1 | 5/2004 | Yau et al. |
| 2005/0182154 | A1 | 8/2005 | Berge et al. |
| 2009/0137734 | A1 | 5/2009 | Pajerski |

FOREIGN PATENT DOCUMENTS

| EP | 1564266 A1 | 8/2005 |
|---|---|---|
| WO | 2006027544 A1 | 3/2006 |

* cited by examiner

*Primary Examiner* — Betelhem Shewareged
(74) *Attorney, Agent, or Firm* — Samuel B. Laferty

(57) ABSTRACT

An aqueous ink jet ink is made by forming a mixture of a pigment, an optional dispersant if the pigment is not self-dispersing, dispersing, and a urethane polymer or prepolymer dispersion in water. This ink is useful in a variety of ink jet printing applications such as printing on wide format substrates and textiles.

12 Claims, No Drawings

AQUEOUS INK JET INK COMPOSITION

CROSS REFERENCE TO RELATED APPLICATION

This application claims priority from PCT Application Serial No. PCT/US2011/030279 filed on Mar. 29, 2011 which claims the benefit of U.S. Provisional Application No. 61/319,404 filed on Mar. 31, 2010.

FIELD OF THE INVENTION

This invention relates to an aqueous ink jet ink compositions comprising a urethane polymer or prepolymer in dispersed form as a binder, water, a pigment, and optionally a dispersant if desirable to form a stable dispersion of the pigment in the composition.

BACKGROUND OF THE INVENTION

U.S. Pat. No. 5,696,182 relates to an ink comprising water, a water-soluble organic solvent, a coloring material and a water-soluble oligomer.

U.S. Pat. No. 7,176,248 relates to a smear resistant ink jet ink using an aqueous carrier, a urethane dispersion as binder, and self-dispersing pigments.

US20040085419 relates to an ink jet ink comprising pigment, water optionally with water-miscible co-solvent, and a polyurethane of a specific formula.

US H2113H1 relates to a process for the preparation of an ink which comprises mixing an ink vehicle, a colorant and a polyurethane resin emulsion.

US 2005/0182154 discloses ink jet inks containing crosslinked polyurethanes.

SUMMARY OF THE INVENTION

Here, aqueous dispersions of urethane prepolymers or polyurethane for use as a binder in an ink jet ink formulation and the ink jet formulation are described. They are made by (1) forming a mixture of a polyurethane prepolymer in the substantial absence of water (due to the sensitivity of isocyanates to water), and then (2) dispersing the prepolymer (with or without chain extension and/or neutralization of acid groups) in an aqueous medium. Optionally, (3) the prepolymer acid groups can be neutralized and/or the prepolymer can be chain extended with appropriate reactants. The prepolymer and/or polyurethane can optionally be crosslinked after dispersion and/or after exiting the ink jet nozzle.

In one embodiment, the dispersions are prepared by reacting in the substantial absence of water (1) at least one polyisocyanate; (2) at least one active hydrogen containing compound, and (3) optionally, at least one water-dispersibility enhancing compound to form a prepolymer (which is often isocyanate terminated at this stage and later chain extended to a higher molecular weight). This prepolymer is optionally neutralized by reaction with at least one neutralizing agent, dispersed in an aqueous medium, and optionally chain extended by reaction with at least one of water, inorganic or organic polyamine having an average of about 2 or more primary and/or secondary amine groups, or combinations thereof. The urethane prepolymer and/or polyurethane are optimized in chemical composition and colloidal stabilization for use in ink jet ink formulations.

The ink jet ink is formulated from components depending on the performance required of the ink. Ink for wide format printing and for textile printing is a preferred embodiment in this application. These inks need to print quickly, provide a permanent robust image, and not transfer to other surfaces to which the printed ink may contact. The ink also needs to resist depositing in the ink jet nozzle or otherwise fouling the ink jetting system. The ink may be subjected to heating or compression as part of the ink jetting process. The ink droplet exiting the print head desirably forms a single droplet on the surface of the substrate and thereafter forms a precisely applied adherent image on the substrate.

In one embodiment, the ink jet ink comprises a polyurethane resin dispersion made from an aliphatic diisocyanate (preferably with 4-30 carbon atoms in the aliphatic portion of the diisocyanate, and more preferably a cycloaliphatic diisocyanate with 4-30 carbon atoms) reacted with a poly(glycol adipate) and optionally with a hydroxy-carboxylic acid component that imparts water dispersibility to the prepolymer when neutralized with an amine or other base. In one embodiment, the poly(glycol adipate) is selected from glycols having 3 to 8 carbon atoms and preferably neopentyl glycol and/or 1,6-hexanediol. In one embodiment, that poly(glycol adipate) has a molecular weight from about 500 to about 10,000 Dalton. In one embodiment, the prepolymer consists essentially of the reaction product of said diisocyanate, said poly(glycol adipate) and said hydroxy-carboxylic acid and does not include significant amounts of other components such as nonionic water-dispersibility enhancing components or low molecular weight diols or triols (e.g., comprising 2-20 carbon atoms). In these embodiments, the urethane component is seen as imparting to the ink good characteristics to easily pass through the ink jet printing process and to form a durable image.

DETAILED DESCRIPTION OF THE INVENTION

In accordance with the invention, a polyurethane prepolymer (which is often isocyanate terminated) is prepared in the substantial absence of water (to minimize degradation reactions between isocyanate groups and water) and then dispersed in an aqueous medium to form a dispersion of polyurethane prepolymer. This prepolymer is optionally neutralized by reaction with at least one neutralizing agent, dispersed in an aqueous medium, and optionally chain extended by reaction with at least one of water, inorganic or organic polyamine having an average of about 2 or more primary and/or secondary amine groups, or combinations thereof. The urethane prepolymer and/or polyurethane are optimized in chemical composition and colloidal stabilization for use in ink jet ink formulations. This polyurethane or prepolymer is mixed with a pigment (possibly a self-dispersible pigment or a pigment in combination with a suitable dispersant) in an aqueous media (optionally including up to 50 or 60 wt. % water soluble organics like glycols, glycol ethers, glycerin) to form an ink jet ink. The ink jet ink will be called a formulation and can include other additives such as humectants, other binders, viscosity modifiers, surface active agents, corrosion inhibitors, etc. The ink needs to resist depositing in the ink jet nozzle or otherwise fouling the ink jetting system. The ink may be subjected to heating or compression as part of the ink jetting process. The ink droplet exiting the print head desirably forms a single discrete droplet on the surface to be printed and does not easily blur into adjacent drops or abrade away (rub and scratch resistance) during the printing process or during use of the article formed. Rub resistance may relate to the image surface quality while scratch resistance may relate to adhesion of the ink to the substrate or any intervening layers between the actual substrate and the ink.

Definitions

In this document, "polyurethane" is a generic term used to describe polymers including oligomers (e.g., prepolymers) which contain the urethane group, i.e., —O—C(=O)—NH—, regardless of how the polymers are made. As well known, these polyurethanes can contain additional groups such as urea, allophanate, biuret, carbodiimide, oxazolidinyl, isocynaurate, uretdione, etc. (that were formed during the polymer synthesis) in addition to urethane groups.

"Wt. %" means the number of parts by weight of monomer per 100 parts by weight of polymer, or the number of parts by weight of ingredient per 100 parts by weight of composition or material of which the ingredient forms a part.

"Aqueous medium" means a composition containing a substantial amount of water. It may contain other water soluble and/or water dispersible ingredients as well.

The "final polyurethane product" refers to the form of the polyurethane in the aqueous dispersion product of this invention or the polyurethane in the dried image. Where the polyurethane prepolymer is optionally chain extended, the final polyurethane product is this chain extended polymer. Where the polyurethane prepolymer is not chain extended, the final polyurethane product is the prepolymer itself. When the polyurethane is partially or fully crosslinked before or after exiting the ink jet nozzle, the polyurethane product can be the crosslinked polyurethane. In a preferred embodiment, the polyurethane exists as a dispersed oleophilic phase within a water based medium. The dispersed phase is desirably colloidally stabilized by ionic segments on the polyurethane such as those derived from hydroxy-carboxylic acids.

"Substantial absence of water" refers to compositions formed without the intentional addition of any significant amount water, e.g., about 2 wt. % or so.

Polyurethane Prepolymer Ingredients

The polyurethane prepolymers of this invention are formed from at least one polyisocyanate, at least one active hydrogen-containing compound and, optionally, at least one water-dispersibility enhancing compound.

Polyisocyanate

Suitable polyisocyanates have an average of about two or more isocyanate groups, preferably an average of about two to about four isocyanate groups per molecule and include aliphatic, cycloaliphatic, araliphatic, and aromatic polyisocyanates, as well as products of their oligomerization, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylenediisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl)cyclohexane, and the like. Preferred cycloaliphatic polyisocyanates include dicyclohexylmethane diisocyanate (most preferred) and isophorone diisocyanate. In one preferred embodiment, at least 50, more desirably at least 75, and preferably at least 85 mole % of the polyisocyanate used in reacting a polyisocyanate with an active-hydrogen containing compound to form a urethane polymer or prepolymer is a cycloaliphatic polyisocyanate and preferably dicyclohexylmethane diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, and the like. A preferred aromatic polyisocyanate is toluene diisocyanate.

Active Hydrogen-containing Compounds

Any compound that provides a source of active hydrogen for reacting with isocyanate groups via the following reaction: —NCO+H—X→—NH—C(=O)—X, can be used as the active hydrogen-containing compound in this invention. Examples include but are not limited to polyols, polythiols and polyamines.

"Polyol" in this context means any product having an average of about two or more hydroxyl groups per molecule. Examples include low molecular weight products called "extenders" with number average molecular weight less than about 500 Dalton such as aliphatic, cycloaliphatic and aromatic polyols, especially diols, having 2-20 carbon atoms, more typically 2-10 carbon atoms, as well as "macroglycols," i.e., polymeric polyols having molecular weights of at least 500 Daltons, more typically about 1,000-10,000 Daltons, or even 1,000-6,000 Daltons. Examples of such macroglycols include polyester polyols including alkyds, polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, halogenated polyesters and polyethers, and the like, and mixtures thereof. The polyester polyols, polyether polyols, polycarbonate polyols, polysiloxane polyols, and ethoxylated polysiloxane polyols are preferred. The polyester polyols are most preferred.

The polyester polyols typically are esterification products prepared by the reaction of organic polycarboxylic acids or their anhydrides with a stoichiometric excess of a diol or diols. Examples of suitable polyols for use in the reaction include poly(glycol adipate)s, poly(ethylene terephthalate) polyols, polycaprolactone polyols, alkyd polyols, orthophthalic polyols, sulfonated and phosphonated polyols, and the like, and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic or aromatic dibasic acids.

Particularly interesting polyols are the polyester diols, i.e., any compound containing the —C(=O)—O— group. Examples include poly(butanediol adipate), poly(caprolactone)s, acid-containing polyols, polyesters made from hexane diol, adipic acid and isophthalic acid such as hexane adipate isophthalate polyester, hexane diol neopentyl glycol adipic acid polyester diols, e.g., Piothane 67-3000 HNA (Panolam Industries) and Piothane 67-1000 HNA; as well as propylene glycol maleic anhydride adipic acid polyester diols, e.g., Piothane 50-1000 PMA; and hexane diol neopentyl glycol fumaric acid polyester diols, e.g., Piothane 67-500 HNF. Other preferred polyester diols include Rucoflex™. S1015-35, S1040-35, and S-1040-110 (Bayer Corporation). In one preferred embodiment, at least 50, more desirably at least 75, and preferably at least 85 mole % of the active-hydrogen containing compound used in reacting a polyisocyanate with an active-hydrogen containing compound to form the urethane polymer or prepolymer is a polyester from aliphatic linear and branched diols reacted with adipic acid and preferably a copolymer of 1,6-hexane diol, neopentyl glycol, and adipic acid. In one embodiment the mole ratio of 1,6-hexane diol to neopentyl glycol in the copolymer is 90:10 to 10:90, in another embodiment the ratio is 75:25 to 25:75. In one embodiment at least 90 mole % of the acid in said copolymer is adipic acid. In one embodiment at least 90 mole % of the diol in said copolymer is 1,6-hexane diol or neopentyl glycol.

The polyether polyols that can be used as the active hydrogen-containing compound in accordance with the present invention contain the —C—O—C— group. They can be obtained in a known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, styrene oxide, tetrahydrofuran, epichlorohydrin, and the like, and mixtures thereof. Preferred polyethers include poly(propylene glycol), polytetrahydrofuran, and copolymers of poly(ethylene glycol) and poly(propylene glycol).

Polycarbonate polyols include those containing the —O—C(=O)—O— group. They can be obtained, for example, from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene. Aliphatic and cycloaliphatic polycarbonate polyols can also be used. In one preferred embodiment, at least 50, more desirably at least 75, and preferably at least 85 mole % of the active-hydrogen containing compound used in reacting a polyisocyanate with an active-hydrogen containing compound to form the urethane polymer or prepolymer is a polycarbonate.

Useful polyhydroxy polyacetals include the compounds that can be prepared from the reaction of (A) aldehydes, such as formaldehyde and the like, and (B) glycols such as diethylene glycol, triethylene glycol, ethoxylated 4,4'-dihydroxy-diphenyldimethylmethane, 1,6-hexanediol, and the like. Polyacetals can also be prepared by the polymerization of cyclic acetals.

Instead of or in addition to a polyol, other compounds may also be used to prepare the prepolymer. Examples include polyamines, polyester amides and polyamides, such as the predominantly linear condensates obtained from reaction of (A) polybasic saturated and unsaturated carboxylic acids or their anhydrides, and (B) polyvalent saturated or unsaturated aminoalcohols, diamines, polyamines, and the like, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethyl-cyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'-tris-(2-aminoethyl)ethylene diamine, N—[N-(2-aminoethyl)-2-amino-ethyl]-N'-(2-aminoethyl)-piperazine, N-(2-aminoethyl)-N'-(2-piperazinoethyl-1)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-tri-methyl-cyclohexane (isophorone diamine or IPDA), bis-(4-aminocyclohexyl)-m-ethane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine™. D-2000 and D-4000, which are amine-terminated polypropylene glycols, differing only by molecular weight, and which are available from Huntsman Chemical Company.

Another way to describe polyurethanes relates to weight percentage of hard and soft segments in the polyurethane. The hard segments in the polyurethane are typically characterized as the isocyanate component, and any low molecular weight (<500 Daltons) polyol chain extenders, diamines and polyamines (generally in the same molecular weight range), and the hydroxycarboxylic acids used as water dispersibility enhancing components. The soft segments are the polymeric polyols of at least 500 Daltons (number average molecular weight). In one embodiment, the amount of soft segments is desirable from about 30 to about 85 wt. % of the polyurethane (with the components forming the hard segment being the complimentary amount), more desirably from about 35 to about 75 wt. % of the polyurethane, and preferably from about 40 to about 65 or 72 wt. % of the polyurethane (with the components forming the hard segments being the complimentary amount).

Water-Dispersibility Enhancing Compounds

Polyurethanes are generally hydrophobic (oleophilic) and not water-dispersible. In accordance with one embodiment of the invention, therefore, at least one water-dispersibility enhancing compound (i.e., monomer), which has at least one, hydrophilic, ionic or potentially ionic group is optionally included in the polyurethane prepolymer to assist dispersion of the polyurethane prepolymer as well as the chain-extended polyurethane made therefrom in water, thereby enhancing the stability of the dispersions so made. Typically, this is done by incorporating a compound bearing at least one hydrophilic group or a group that can be made hydrophilic (e.g., by chemical modifications such as neutralization) into the polymer chain. These compounds may be of a nonionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number from about 1 to about 60, typically 1 or 5 to about 40, or 7 or 10 to 35, 12 to 30, or 14 to 25. Other water-dispersibility enhancing compounds can also be reacted into the prepolymer backbone through urethane linkages or urea linkages, including lateral or terminal hydrophilic ethylene oxide or ureido units.

Water dispersibility enhancing compounds of particular interest are those which can incorporate carboxyl groups into the prepolymer. Normally, they are derived from hydroxy-carboxylic acids having the general formula $(HO)_xQ(COOH)_y$, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof. Dihydroxy-carboxylic acids are more preferred with dimethylolpropanoic acid (DMPA) being most preferred.

Another group of water-dispersibility enhancing compounds of particular interest are side chain hydrophilic monomers. Some examples include alkylene oxide polymers and copolymers in which the alkylene oxide groups have from 2-10 carbon atoms (preferably having 2 carbon atoms per repeat unit) as shown, for example, in U.S. Pat. No. 6,897,281, the disclosure of which is incorporated herein by reference.

Other suitable water-dispersibility enhancing compounds include thioglycolic acid, 2,6-dihydroxybenzoic acid, sulfoisophthalic acid, polyethylene glycol, and the like, and mixtures thereof.

Compounds having at Least One Crosslinkable Functional Group

Compounds having at least one crosslinkable functional group can also be incorporated into the polyurethane prepolymers of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into the original groups from which they were derived.

Other suitable compounds providing crosslinkability include thioglycolic acid, 2,6-dihydroxybenzoic acid, and the like, and mixtures thereof.

Catalysts

The prepolymer may be formed without the use of a catalyst if desired but may be preferred in some instances. Examples of suitable catalysts include stannous octoate, dibutyl tin dilaurate, and tertiary amine compounds such as triethylamine and bis-(dimethylaminoethyl)ether, morpholine compounds such as beta,beta-dimorpholinodiethyl ether, bismuth carboxylates, zinc bismuth carboxylates, iron (III) chloride, potassium octoate, potassium acetate, and DABCO® (diazabicyclo[2.2.2]octane), from Air Products. The preferred catalyst is a mixture of 2-ethylhexanoic acid and stannous octoate, e.g., FASCAT®. 2003 from Elf Atochem North America.

Ingredient Proportions

Normally, the prepolymer produced in the present invention will be isocyanate-terminated. For this purpose, the ratio of isocyanate groups to active hydrogen groups in the prepolymer typically ranges from about 1.3/1 to about 2.5/1, preferably from about 1.5/1 to about 2.1/1, and more preferably from about 1.7/1 to about 2/1. This results in an isocyanate terminated prepolymer of limited molecular weight (due to the stoicheometry of active groups deviating from 1:1).

The typical amount of water-dispersibility enhancing compound chemically incorporated into the prepolymer will be up to about 50 wt. %, more typically from about 2 wt. % to about 30 wt. %, and more especially from about 2 wt. % to about 10 wt. % based on the total weight of the prepolymer.

The amount of optional compounds having crosslinkable functional groups in the prepolymer will typically be up to about 1 milliequivalent, preferably from about 0.05 to about 0.5 milliequivalent, and more preferably from about 0.1 to about 0.3 milliequivalent per gram of final polyurethane on a dry weight basis.

The amount of catalyst used to form the prepolymer will typically be from about 5 to about 200 parts per million of the total weight of prepolymer reactants.

In this patent application, the term "consisting essentially of" when describing the polyurethane or polyurethane dispersion will mean the polyisocyanate component, the active-hydrogen containing species (which will include the poly (glycol adipate) and the hydroxy-carboxylic acid that functions to create dispersibility in water for the prepolymer or polyurethane, an optional chain extender for the prepolymer, and an optional prepolymer neutralizing agent. "Consisting essentially of" shall exclude agents in amounts that materially affect the nature and performance of the polyurethane such as amounts of aromatic isocyanates that might effect the aliphatic isocyanate type polyurethane, active-hydrogen containing species in amount that will affect the nature of the urethane associated with the poly(glycol adipate), other dispersibility enhancing components in amounts that affect dispersibility such as nonionic or cationic dispersants, etc.

Prepolymer Manufacture

Aqueous dispersions of polyurethane composite particles are made in accordance with this invention by forming the polyurethane prepolymer in the substantial absence of water and then dispersing this blend in an aqueous medium. This can be done in any fashion so long as a continuous mass of the prepolymer (as opposed to discrete particles of the prepolymer) is formed in the substantial absence of water before the prepolymer is combined with water. Typically, prepolymer formation will be done by bulk or solution polymerization of the ingredients for the prepolymer.

Bulk and solution polymerization are well known techniques and are described, for example, in "Bulk Polymerization," Vol. 2, pp 500-514, and "Solution Polymerization," Vol. 15, pp 402-418, *Encyclopedia of Polymer Science and Engineering*, ©1989, John Wiley & Sons, New York. See, also, "Initiators," Vol. 13, pp. 355-373, Kirk-Othmer, *Encyclope-*

*dia of Chemical Technology*, ©1981, John Wiley & Sons, New York. The disclosures of these documents are also incorporated herein by reference.

Dispersion in an Aqueous Medium

Once the polyurethane prepolymer is formed, it is dispersed in an aqueous medium to form a polyurethane dispersion of the prepolymer. Dispersing the prepolymer blend in an aqueous medium can be done by any conventional technique. Normally, this will be done by combining the prepolymer and water with mixing. Where solvent polymerization is employed, the solvent and other volatile components can optionally be distilled off from the final dispersion, if desired.

In one embodiment of the invention, where the prepolymer includes enough water-dispersibility enhancing compound chemically incorporated into the prepolymer to form a stable dispersion without added emulsifiers (lower molecular weight (not being chemically bound to the prepolymer) surfactants), the dispersion can be made without such compounds, i.e., substantially free of surfactants, if desired. The advantage of this approach is that the coatings or other products made from the polyurethane exhibit less water sensitivity, better film formation, less foaming and reduced growth of mold, bacteria and so forth.

Prepolymer Neutralization

In those instances in which the prepolymer includes water-dispersibility enhancing compounds (chemically bound into the prepolymer) which produce pendant carboxyl groups, these carboxyl groups can be converted to carboxylate anions for enhancing the water-dispersibility of the prepolymer.

Suitable neutralizing agents for this purpose include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. Neutralizing agents differ from chain extension agent by their function and the nature of association with the prepolymer. It is recognized that primary or secondary amines may be used in place of tertiary amines, if they are sufficiently hindered to avoid interfering with the chain extension process.

Chain Extension

The aqueous prepolymer particle dispersions produced as described above can be used as is, if desired. Alternatively, they can be chain extended to convert the prepolymers in the particles to more complex (higher molecular weight) polyurethanes.

As a chain extender, at least one of water, inorganic or organic polyamines having an average of about 2 or more primary and/or secondary amine groups, polyalcohols, ureas, or combinations thereof are suitable for use in this invention. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable polyalcohols include those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and it derivatives, and the like, and mixtures thereof. Hydrazine is preferred and is most preferably used as a solution in water. The amount of chain extender typically ranges from about 0.5 to about 1.1 equivalents based on available isocyanate.

Additional Ingredients and Features

The polyurethane prepolymers, the product polyurethanes produced therefrom, and the aqueous urethane dispersions of the present invention as described above can be made with various additional ingredients and features in accordance with known polyurethane technology.

Polymer Branching

Branching of the ultimate polymer product, as well as the prepolymer, can be accomplished for the purpose of enhancing tensile strength and improving resistance to creep—that is, recovery to that of or near its original length after stretching. In this regard, see U.S. Pat. No. 6,897,281, the disclosure of which has been incorporated herein by reference above.

Monofunctional Active Hydrogen-Containing Compounds

The prepolymers of this invention can also be made with monofunctional active hydrogen-containing compounds to enhance dispersibility of the prepolymer in an aqueous medium and impart other useful properties, for example, cross-linkability, as well as to adjust the morphology and rheology of the polymer when coated onto a substrate, as also described in the above-noted U.S. Pat. No. 6,897,281.

Plasticizers

The polyurethane prepolymers and ultimate polyurethane products of this invention can be prepared in the presence of a plasticizer. The plasticizer can be added at any time during prepolymer preparation or dispersion or to the polyurethane during or after its manufacture. Plasticizers well known to the art can be selected for use in this invention according to parameters such as compatibility with the particular polyurethane and desired properties of the final composition. See, for example, WO 02/08327 A1, as well as the above-noted U.S. Pat. No. 6,897,281.

Other Additives for Preparation of Dispersions

Other additives well known to those skilled in the art can be used to aid in preparation of the dispersions of this invention. Such additives include stabilizers, defoamers, antioxidants (e.g., Irganox 1010), UV absorbers, carbodiimides, activators, curing agents, stabilizers such as carbodiimide, colorants, pigments, neutralizing agents, thickeners, non-reactive and reactive plasticizers, coalescing agents such as di(propylene glycol) methyl ether (DPM), waxes, slip and release agents, antimicrobial agents, surfactants such as Pluronic™ F68-LF and IGEPAL™ CO630 and silicone surfactants, metals, coalescents, salts, flame retardant additives, antiozonants, anti-corrosion additives, and the like. They can optionally be added as appropriate before and/or during the processing of the dispersions of this invention into finished products as is well known to those skilled in the art. Additives may also be used as appropriate in order to make articles or to treat other products (such as by impregnation, saturation, spraying, coating, or the like). The urethane dispersions of this invention as manufactured typically have total solids of at least about 20 wt. %, preferably at least about 25 wt. % and more preferably at least about 30 wt. %. Subsequently, they will be diluted as part of ink manufacture.

Blends with other Polymers and Polymer Dispersions

The dispersions of this invention can be combined with commercial polymers and polymer dispersions by methods well known to those skilled in the art. Such polymers and dispersions include those described in WIPO Publication WO 02/02657 A2, U.S. Pat. Nos. 4,920,176, 4,292,420, 6,020, 438, 6,017,997 and a review article by D. P. Tate and T. W. Bethea, Encyclopedia of Polymer Science and Engineering, Vol. 2, p. 537, the disclosures of which are incorporated herein by reference.

Hybrids with other Polymers

The aqueous dispersions of this invention can also be used as seed polymers for forming hybrids of polyurethanes with other polymers (e.g., acrylate polymers). This can be done by forming the aqueous dispersions of polyurethane dispersion in the manner described above, and then polymerizing additional monomers by emulsion or suspension polymerization in the presence of these dispersions, i.e., with the inventive dispersions being mixed with the additional monomers before polymerization is completed. Hybrids of polyurethanes and acrylics can be made to advantage by this approach.

Still another way of making hybrid polymers in accordance with the present invention is to include ethylenically unsaturated monomers in the polyurethane prepolymer reaction system and to cause those monomer(s) to polymerize when or after the prepolymer is dispersed in an aqueous medium. In this approach, the ethylenically unsaturated monomers act as a diluent during prepolymer formation and/or prepolymer dispersion. In the aqueous medium, these ethylenically unsaturated monomers can be polymerized to completion with or without additional monomers being added. Hybrids of polyurethanes and acrylics can be made to advantage by this approach, as well.

Water-Borne Energy Curable Polyurethane Compositions

It is already known that water-borne polyurethane and hybrid compositions that can be cured by application of energy (UV and IR radiation and/or electron beams) can be made by end-capping the polyurethane with (meth)acrylic esters and other ethylenically unsaturated monomers. This technology can be applied to this invention to provide energy-curable water-borne polyurethane inks or ink jet applied coatings.

Alternative Methods of Manufacture

Described above is a typical way the dispersions of the present invention can be made, i.e., by forming a prepolymer in the substantial absence of water, and then dispersing the blend in an aqueous medium with mixing. Other known ways of making aqueous polyurethane dispersions can also be used to make the urethane dispersions of this invention, provided that the prepolymer ends up being a dispersion in an aqueous medium. Examples of alternate methods of making urethane dispersions are given below.

Prepolymer Shear Mixing

In this method, the prepolymer is dispersed by shear forces with emulsifiers (external emulsifiers, such as surfactants, or internal emulsifiers having nonionic, anionic, cationic and/or zwitterionic groups incorporated as part of or pendant to the polyurethane backbone, and/or as end groups on the polyurethane backbone). This method often uses diluents to lower the prepolymer viscosity and one tends to avoid high temperatures as degradation of residual isocyanate groups on the prepolymer may occur. The prepolymer can be chain extended with polyamines after dispersion.

Acetone Process

A prepolymer is formed with or without the presence of acetone, MEK, and/or other polar solvents that are non-reactive with isocyanate groups and easily distilled. The prepolymer is further diluted in said solvents as necessary for viscosity control, and chain extended with an active hydrogen-containing compound. Water is added to the chain-extended polyurethane, and the solvents are distilled off. A variation on this process would be to chain extend the prepolymer after its dispersion into water.

Melt Dispersion Process

An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde. This method can tolerate higher temperatures than Prepolymer Shear Mixing and can use less or no diluent for viscosity control.

Ketazine and Ketimine Processes

Hydrazines or diamines are reacted with ketones to form ketazines or ketimines. These are added to a urethane prepolymer, and remain inert to the isocyanate groups. As the prepolymer is dispersed in water, the hydrazine or diamine is liberated, and chain extension of the prepolymer takes place as the dispersion is taking place.

Continuous Process Polymerization

An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), an optional neutralizing agent, water, and an optional chain extender and/or surfactant.

Reverse Feed Process

Water and optional neutralizing agent(s) and/or extender amine(s) are charged to the prepolymer under agitation. The prepolymer can be neutralized before water and/or diamine chain extender is added.

Applications in Ink Jet Ink

A preferred use for the prepolymer or urethane polymer dispersion in an aqueous media is as a binder in an ink jet ink. Ink jet ink can be distinguished from other inks in that it is applied via a jetting technology of one or more colored inks to the desired substrate (also called non-impact printing) to create an image on the substrate. The other printing processes (impact types) include flexo, gravure printing, etc. Jetting is the transport of the ink through an orifice in the printing device and application to specific areas of the substrates (with the location or specific areas where the ink is applied being digitally controlled) where an image of a particular color(s) is desired. The orifices tend to be 10-50 microns in diameter and the print head is away from the printed surface by 0.1 to 1". Orifices for jetting can be in columns, rows, and other configurations to allow the jetting of multiple columns, rows, and/or colors of ink in a single pass of the jetting device over a particular portion of the substrate. Digital technology helps coordinate the location of the jetting device relative to the x and y coordinates on the substrate such that control of the ink jetting process, color of ink, etc. creates the desired digitally controlled image. The smaller the orifice and the smaller the drop size the higher the resolution of the image (measured in dots per inches (dpi)). The jetted ink portions tend to be 1-80 pico liters, depending on the resolution desired. Based on the print head technology and its design, inks of lower viscosity (e.g., 2-5 cps) or higher viscosity (e.g., 10-15 cps) can be used at the operating temperature. Lower viscosity inks tend to have smaller jetted drop sizes and higher viscosity inks tend to have slightly larger jetted drop sizes. The surface tension for both will desirably be from 25-40 dynes/cm based on the substrate to be printed.

Jetting rates of 50,000-100,000 drops/sec are possible with an accuracy of 0.5 to 1 pixel. Drop velocities exiting from the jetting device can easily be 5-15 msec.

At least two types of ink jet printing exists (Continuous and Drop-on-Demand ink jet). In Continuous ink jet printing, a continuous stream of ink droplets is created though each orifice. The drops are either charged or un-charged. This method allows the charged drops to create an image on the media (substrate) and permits the uncharged drops to be collected into a gutter for recirculation. In Drop-on-Demand technology, the ink drops are only generated (formed) when needed to create images on the media (substrate) eliminating the need to selectively charge some drops and re-circulate the non-charged drops. Methods of creating the drops include thermal, piezoelectric, electrostatic, and acoustics. Thermal and piezoelectric are more often used.

The ink jet ink composition desirably comprises from about 0.2 or 1 to 10, more desirably from about 0.2 or 2 to 8, and preferably from about 0.2 or 2 to 6 wt. % of a pigment or dye (without water or solvent); from about 20 to 84 or 87, more desirably from about 30 to 83 or 85 and preferably from about 30-60 or 85 wt. % water; from about 1 or 5 to about 30, more desirably from about 2 or 5 to about 15, and preferably from about 2 or 5 to about 10 wt. % binder (polyurethane portion of the polyurethane dispersion); from about 10 to about 30 or 44 wt. % solvent and/or co-solvents (other than or in addition to water); and from about 0.1 to about 5 wt. % other additives based on the weight of the ink composition.

The composition and manufacture of the polyurethane dispersion can impart several useful properties to deposited ink including consistent drop size, low orifice plugging rates, low buildup of solids in the orifice (including shear stability during jetting), optimized surface tension for jetting from the orifice, low or non-foaming, environmental acceptability, fast drying on the substrate, low surface tack subsequent to printing, and less drying or depositing of ink (or its components) in the orifice of the jetting device head. Optimized polyurethane dispersions can impart desirable properties in the image from the ink such as abrasion, mar, rub, and scratch resistance; crosslinking or self-crosslinking; barrier properties; flame retardance; water, chemical, and stain resistance; color-fastness; light fastness (fade resistance); non-yellowing; wash resistance; higher tensile strength; catalytic activity, biocidal activity, magnetic and electric properties; optical properties (gloss, matt, flat, etc.) and effects; UV and radiation blocking; UV stability; self assembly; and so forth. In one embodiment, the ink will include additives selected from biocide, corrosion inhibitor, pH modifier, glycols, and surfactants to control the surface energy (which will affect the surface wetting and contact with the orifice of the jetting mechanism). In one embodiment, the ink jet ink will have at least four or five colors (i.e., cyan, yellow, magenta, white (optional), and black. The ink will be brightly colored.

Dispersion of Pigments or Dyes to Color the Ink Jet Ink

If pigments are used for coloring instead of dyes they generally will be below 200 nm in their largest diameter, more desirably with at least 75% of the particles having a largest dimension of less than 150 nm, more desirably less than 120 nm, and preferably less than 80 nm. It is desirable to filter the ink jet ink through a filter with a pore size of less than 1 micrometer one or more times during the manufacturing to eliminate oversized or agglomerated particles/pigments. Examples of suitable pigments/dyes for inks include organic and inorganic pigments, nano-materials such as metal oxides, metals, carbon black, etc., extenders and fillers; dyes, especially disperse dyes; optical brightening agents and textile auxiliaries dyebaths; particulate ceramic materials; and magnetic materials and magnetic recording media. A preferred particulate solid is a pigment from any of the recognized classes of pigments described, for example, in the Third Edition of the Color Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone, perylene, diketopyrrolopyrrol (DPP), and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones, perylene, diketopyrrolopyrrol (DPP), and carbon blacks.

Other preferred particulate solids that may be used in a special purpose ink jet ink are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and fire retardants such as aluminium trihydrate and magnesium hydroxide. Nanomaterials include metal oxides such as oxides of alumina, zirconium, zinc, ferrous silica and titanium, etc., and metals such as silver, gold, copper, etc.

Binder Selection

The binder (urethane polymer or prepolymer of the dispersion in this disclosure) is selected to impart desirable properties for the ink jet printing process and the end use application of the printed substrate. Desirably, the binder will encapsulate the pigment particles in the drying stage to provide a durable film of image. Desirably, the binder will enhance adhesion of the ink to the substrate either by interpenetration of the binder into the substrate, polar interactions of the binder with the substrate, chemical bonding of the binder with the substrate, crosslinking of the binder to the substrate, or just effective wetting of the substrate with the binder. Fast drying (or reduction of tackiness) is a desirable feature of the ink. While the ink desirably dries quickly after being applied to the substrate, it is desirable to keep the ink from drying and forming deposits within the orifice of the jetting device. Humectants can slow drying of the ink in the ink jet orifices, but also slows drying of the image on the substrate. Glycol-water blends in the aqueous phase of the binder are often used to minimize drying of inks in the orifice.

Additives to the Ink Jet Ink

Various additives are useful in ink jet ink to optimize some of the properties/characteristics listed above of the binder dispersions and formulated ink. Dispersants and/or other surface active species that provide steric stabilization layers or enhance the steric stabilization layers on the pigments and/or binder are useful. These help prevent orifice blocking, control viscosity, and minimize pigment agglomeration in the ink. It is desirable that at least a portion of the dispersants and/or other surface active species are dispersants of number average molecular weights above 500 Daltons as higher molecular weight dispersants tend to be less mobile and provide longer term colloidal stability. It is desirable that the dispersants above 500 Daltons utilize water solubilizing segments or chains to provide steric stabilization layers. In one embodiment, it is desirable that the water solubilizing segments comprise poly(alkylene oxides) where the alkylene portion is at least some portion ethylene and optionally some amount of propylene. In one embodiment, at least 10 wt. % of the dispersant is water solubilizing segments (characterized by having water solubility of at least 10 wt. % in water at 25° C.). In one embodiment, it is desirable that the dispersants and/or other surface active species are so designed that the stability of the colloidal dispersion of pigments and binders in water is maintained for long periods (such as months or years) at 25° C. such that the viscosity of the formulated ink (which is affected by colloidal stability of all dispersed phases) is independent of reasonably anticipated storage times for the ink formulation.

The dispersed phases (pigment, binder, etc.) of the ink typically need to be colloidally stable (lack of aggregation or settling) for six months to one year to avoid shelf life issues on inventory of ink. Additives to protect adjacent surfaces in the ink transport equipment and jetting equipment are desirable to minimize solids buildup on these surfaces (especially during high shear transport of warm or heated ink during the jetting process). Protection of any adjacent jetting surface subject to corrosion (using corrosion inhibitors as additives) is also desirable as corroded surfaces have different wetting characteristics and can have surface irregularities that can disrupt the jetting process. Biocidal additives are desirable as any biological growth within the ink can create high viscosity liquids or solids that may contribute to poor ink flow and/or orifice plugging. Additives to promote or control substrate surface contact angles (or wetting of the substrate with the ink) are desirable as they can help minimize deposits in the orifice during jetting and control the droplet migration on the substrate so that jetted ink droplets merge to form a coherent image but do not bleed into adjacent droplets reducing resolution and color integrity. Surface tension of the ink can also affect wetting and adhesion to the substrate which can affect the durability of the bond of the ink to the substrate. Mordants can be added (such as cationic additives, inorganic salts, quaternary additives, flocculants, etc., to minimize dry time, minimize migration on the substrate surface, etc. Rheology modifiers can be added to control ink viscosity to achieve effects like minimizing penetration into the substrate and/or maintaining some coating thickness (especially during heated cure conditions). Surface modifiers for the ink film can be added to achieve a high gloss, moderate gloss, or low gloss ink image (matt, flat, etc.). Flame retardant additives can be incorporated into the ink to help promote fire resistance of the coated substrate. Additives may include specialty solvents such as propylene glycol, glycerin, isopropyl alcohol, PEG's (200-600) and glycol ethers like DPME, PMA, etc. The solvents are used such that the surface tension of the ink can be adjusted to desired level based on the print head used and to control the drying both in the orifices and the printed substrates. Additives can include defoamers, air releasing agents, antioxidants, etc.

The aqueous polyurethane dispersions of the present invention, both in prepolymer and chain extended form, can be used to make inks and/or ink jet applied coatings and films for porous and non-porous substrates such as films and fibrous materials such as papers, non-woven materials, textiles, leather, wood, concrete, masonry, metals, house wrap and other building materials, fiberglass, polymeric articles, rolled goods, personal protective equipment (such as hazardous material protective apparel, including face masks, medical drapes and gowns, and firemen's turnout gear), and the like. Applications include papers and non-wovens; fibrous materials; films, sheets, composites, and other articles. The textiles can be used in clothing, upholstery, tents, awnings, and the like. Suitable textiles include fabrics, yarns, and blends, whether woven, non-woven, or knitted, and whether natural, synthetic, or regenerated. Synthetic substrates include polyvinyl chloride, polyethylene, polypropylene, polystyrene, polyesters from hydroxycarboxylic acids, polyesters from polyols and polycarboxylic acids, acrylic fibers or fabrics, cotton fibers or fabrics, etc. The substrates can be pre-coated (via conventional coating techniques or via ink jetting) with an ink receptive coating or an interlayer binder coating. The end use of the printed substrate can be advertising signs and banners (indoors and outdoors), bill boards, signs on buses, signs at point of purchase advertising, etc. Examples of suitable textiles include cellulose acetate, wool, cotton, jute, linen, polyamides, regenerated cellulose (Rayon), and the like.

In one embodiment of this invention, the ink jet ink and ink jet coating compositions of this invention can be used as adhesives or to augment or supplement adhesive types well known to those skilled in the art. For example, particular adhesive properties can be achieved by varying type and amount of isocyanate(s); type, amount, and molecular weight of polyol(s); and amount of poly(alkylene oxide) side chain units. Ink jet application technology can be used to apply pigmented or non-pigmented inks or coatings in various patterns to textiles and other materials to facilitate the formation of precision controlled bond lines between two or more substrates.

In one embodiment, the polyurethane dispersions used to make the ink are based on polyurethanes with laterally attached nonionic colloidally stabilizing poly(alkylene oxides) such as poly(ethylene oxide) that form coatings of breathable polyurethanes, such as described in U.S. Pat. No. 6,897,281, as well as to the technique for manufacturing core-shell polyurethane dispersions described in U.S. Published Patent Application No. 20050004306. The disclosures of the above patent and published applications are incorporated herein by reference.

EXAMPLES

The following examples are presented to illustrate this invention:
Chemicals Used in Examples
DBA=dibutylamine
H12MDI=Desmodur W=1,1'-methylenebis-(4-isocyanato cyclohexane) from Bayer Corporation
IPDI=Isophorone diisocyanate
HNA is a diol polyester from 1,6-hexane diol, neopentyl glycol, and adipic acid
BA is a diol polyester from butylene glycol and adipic acid
HA is a diol polyester from 1,6-hexane diol and adipic acid
DMPA=dimethylolpropanoic acid.
FASCAT® 2003=2-ethylhexanoic acid and stannous octoate
Hyd=Hydrazine solution typically added as a 35 wt. % solution in water
NMP=1-methyl-2-pyrrolidone
TEA=triethylamine;
DETA=diethylenetriamine;

NCO ratio is the ratio of isocyanate groups to hydroxyl groups in the prepolymer;
MEK is methyl ethyl ketone;
PUD Examples
Prepolymer Step The polyol, the isocyanate and one drop of FASCAT® 2003 catalyst were allowed to react for one and a half hours with mixing at 200-210° F. (93-99° C.) under a blanket of dry nitrogen. The solvent and acid were then charged to the reactor and allowed to react for one additional hour until appropriate remaining isocyanate (NCO) level was reached employing an NCO:OH ratio of 2:1. The NCO was determined by titration with DBA and 1M HCl. The mixture was cooled to 130° F. (54° C.) and the neutralizer was charged. After 15 minutes mixing, the mixture was dispersed in the Dispersion and Extension Step as set forth below.

Dispersion and Extension Step

A portion of the prepolymer was charged with mixing into de-ionized water at room temperature over the course of about 10 minutes to form an NCO-terminated polyurethane prepolymer. After 20 minutes of mixing, the extender was added to chain extend the polyurethane prepolymer, thereby producing an aqueous dispersion of polyurethane particles. The total solids content, pH, particle size, and a Brookfield Viscosity were obtained. A conventional defoamer and/or surfactant could be added if desired. If a volatile solvent was employed, the solvent was removed via vacuum before characterization.

TABLE 1

Prepolymer Composition

| Exp. Prepolymer | Isocyanate Type | Amt g | Polyol Type | Amt g | DMPA g | NMP g | Neutralizer TEA g | NCO Final % |
|---|---|---|---|---|---|---|---|---|
| 1 | H12MDI | 174.7 | HNA | 480.7 | 24.6 | 120 | 14.6 | 3.44 |
| 2 | H12MDI | 240.4 | HNA | 364.2 | 35.3 | 160 | 23.0 | 4.57 |
| 3 | IPDI | 117.9 | HNA | 499.8 | 22.3 | 160 | 13.9 | 1.77 |
| 4 | H12MDI | 264.5 | HNA | 424.7 | 30.6 | 80 | 26.0 | 5.04 |
| 5 | H12MDI | 292.0 | HNA | 327.1 | 32.1 | 152 | 27.3 | 5.52 |
| 6 | H12MDI | 185.0 | HNA | 441.4 | 22.7 | 151 | 19.3 | 3.44 |
| 7 | H12MDI | 194.4 | HNA | 489.6 | 36.0 | 80** | 17.9 | 3.92 |
| 8 | H12MDI | 399.0 | HNA | 201.5 | 48.7 | 151 | 26.9 | 7.98 |
| 9 | H12MDI | 229.5 | HNA | 373.6 | 48.9 | 152 | 29.0 | 4.55 |
| 10 | H12MDI | 135.1 | HNA | 596.2 | 18.7 | 175 | 13.8 | 2.28 |
| 11 | H12MDI | 352.9 | HNA | 279.7 | 16.2 | 151 | 13.8 | 7.01 |
| 12 | H12MDI | 310.7 | BA | 289.4 | 48.6 | 151 | 28.9 | 6.17 |
| 13 | H12MDI | 293.7 | BA | 338.9 | 16.2 | 151 | 13.8 | 5.39 |
| 14 | H12MDI | 391.9 | HA | 208.3 | 48.6 | 151 | 26.9 | 7.77 |
| 15 | H12MDI | 250.4 | HA | 349.8 | 48.6 | 151 | 28.9 | 5.13 |

**The solvent in Ex. 7 was MEK rather than NMP

TABLE 2

Dispersion from Prepolymer

| Ex. PUD | Pre-Polymer (#) gram | Water amount gram | Extender Type | Extender Amount (g) | Total Solids wt % | pH | Vis. Cps | Part. Size nm |
|---|---|---|---|---|---|---|---|---|
| 1 | 600 (1) | 657.9 | Hyd | 19.8 | 41.5 | 8.2 | 80 | 103 |
| 2 | 600 (2) | 748.5 | Hyd | 26.3 | 36.7 | 8.3 | 30 | 44 |
| 3 | 600 (3) | 582.0 | Hyd/Deta | 2.89/3.57 | 40.3 | 7.5 | 100 | 96 |
| 4 | 600 (4) | 915.1 | Hyd | 28.9 | 34.7 | 10.0 | 25 | 50 |
| 5 | 600 (5) | 763.0 | Hyd | 31.7 | 34.3 | 9.7 | 28 | 39 |
| 6 | 600 (6) | 771.9 | Hyd | 79.7 | 33.9 | 9.1 | 28 | 209 |
| 7 | 600 (7) | 925.0 | Hyd | 22.5 | 34.0 | 10.1 | 100 | 70 |
| 8 | 600 (8) | 761.4 | Hyd | 45.9 | 41.1 | 8.0 | 63 | 65 |
| 9 | 600 (9) | 761.2 | Hyd | 26.1 | 36.8 | 7.7 | 80 | 65 |
| 10 | 600 (10) | 776.5 | Hyd | 13.1 | 34.1 | 9.5 | 58 | 426 |
| 11 | 600 (11) | 776.5 | Hyd | 40.3 | 39.5 | 9.2 | 15 | 150 |
| 12 | 600 (12) | 761.4 | Hyd | 35.5 | 35.6 | 7.9 | 35 | 32 |
| 13 | 600 (13) | 776.5 | Hyd | 31.0 | 35.5 | 9.4 | 20 | 93 |
| 14 | 600 (14) | 761.3 | Hyd | 44.6 | 38.2 | 8.0 | 85 | <30 |
| 15 | 600 (15) | 761.4 | Hyd | 29.5 | 36.9 | 7.3 | 45 | <30 |

* Hyd is hydrazine DETA is diethylenetriamine

Ink Jet Ink Preparation

The inks were prepared by first blending a masterbatch premix of: water, glycerin, isopropyl alcohol, and predispersed pigment. The pigment concentration was about 3% dry pigment weight in the final ink. The amount of dispersant in the predispersed pigment was determined by the surface area of the pigment and the recommendations of the pigment and dispersant suppliers. Glycerin and isopropyl alcohol were each added in amounts such that each had a final weight percentage in the final ink formulation of about 10%. A measured amount of resin dispersion was added to the masterbatch to provide about 3% dry resin to each ink formulation. Water was the Various pigment dispersions were prepared using Solsperse™ 27,000; 41,000; 41,090; 44,000; 46,000 from Lubrizol Corp.; Efka™ 4560 from BASF; or DISPERSBYK™ 190 from Byk Chemie. Dispersions were prepared from carbon black from Evonik. Dry pigment powders were obtained from Clariant Corporation to prepare inks Some pre-dispersed pigments were evaluated from Clariant Corporation. Water-based ink dispersions were prepared from the common ink jet colors of cyan, magenta, yellow and black pigments. The dispersant concentration was optimized for each pigment while milling with Eiger mill with 0.3 mm diameter beads for about 3 hrs. The viscosities of all the pigment dispersions were <200 cps and the particle size was less than 0.5 micron varying based on the type of the pigment used. Clariant OP-T, a black dispersion was used as the pigment in the inks of Table 3.

Once the pigment dispersions were made, ink samples were made by diluting the pigment dispersions with water, solvents, defoamer along with the test resin while mixing for about an hour. Eight color inks were made to test with an ink jet printer and they were cyan, magenta, yellow, light cyan light magenta, black, light black and light light black. Each of the inks was adjusted for the viscosity and surface tension to the level required for jetting in the Epson printer. All the inks were filtered through <1.0 micron to allow for jetting without clogging the orifices. Test images were made on different substrates such as photographic paper (matt and gloss), textile samples, PVC, PP and PE both coated and uncoated and compared for their print properties such as rub fastness and adhesion based on the test substrate used and the end user requirements.

Additionally, higher viscosity inks (10-15 cps at operating temperature of the print head, 25-70° C.) were made with the same pigment dispersions and tested for print properties. Surface tension of the inks was also considered in the preparation and testing of ink samples.

Test Methods

1. Brookfield Viscosity. Brookfield viscosity testing was performed using a Brookfield RV viscometer and spindles #3 to #6 (depending on viscosity) at 20 rpm and about 77° F.

2. Particle Size Measurements. The particle size and size distribution of the dispersions were obtained by Submicron Particle Sizer AutodilutePAT Model 370 (NICOMP Particle Sizing Systems) using an intensity average with Gaussian distribution.

3. Solids Content. Total solids were measured by Moisture/Solids Analyzer LabWare 9000™ (CEM Corporation).

4. pH Measurements. pH readings were taken using Acumet Basic pH Meter (Fisher Scientific).

5. NCO Titration. A sample of prepolymer (~3 grams) is weighted in a 250-ml Erlenmeyer flask. Toluene (50 ml) and 2M dibutylamine solution in toluene (20 ml) are added and the mixture is heated on a hot plate until the prepolymer completely dissolves. The flask is filled up to 200 ml with isopropanol. Bromophenol blue indicator (6-7 drops) is added and solution is titrated with 1N HCl solution until the color changes from blue to light yellow.

Sample Preparation for the Inks of Table 3

Ink formulas were applied to Epson Premium Glossy Photo Paper 250 and HP Premium Photo Paper Soft Gloss (240) with a #4 WWR and allowed to dry at room temperature for several hours prior to testing.

Dry and Wet Rub Test

The wet and dry rub is tested on the ink surface with a cotton swab. 10 rubs of similar pressure is applied to the same area of the film. An evaluation is made as to whether the ink is easily removed or remains affixed to the substrate surface and any damage done to the surface. The rating system is as follows:

1—Nearly all the ink is removed
1.5—25-75% of the ink is removed
2—Less than 25% half ink is removed or the surface is significantly scuffed
2.5—A small amount of ink is removed and the surface is significantly scuffed
3—No ink is removed, scuffing is easily observed
3.5—Significant change in gloss and scuffing
4—Only a slight amount scuffing occurred
4.5—Slight change in gloss
5—No scuffing or surface damage at all Scratch Test The scratch test is a quick industrial press side evaluation where the surface of the film is scratched with the back of your fingernail.

1—25-100% the ink is completely removed
2—Less than 25% half ink is removed or the surface is significantly scuffed
3—No ink is removed, scuffing is easily observed
4—Only a slight amount scuffing occurred
5—No scuffing or surface damage at all Sutherland Rub Test is ASTM F 2497-05.

TABLE 3

Test Results on Inks Applied to Different Photographic Paper

| Ex. Ink | PUD # | Dry Rub Epson Paper | Dry Rub HP Paper | Wet Rub Epson Paper | Wet Rub HP Paper | Scratch Epson Paper | Scratch HP Paper |
|---|---|---|---|---|---|---|---|
| 1 | 1 | 4.5 | 5.0 | 4.5 | 1 | 4 | 3 |
| 2 | 2 | 4.5 | 4.5 | 4.5 | 1 | 2 | 1 |
| 5 | 5 | 4 | 4 | 4 | 1 | 3 | 2 |
| 8 | 8 | 4.5 | 4 | 4 | 1 | 2 | 2 |
| 9 | 9 | 4.5 | 4.5 | 4 | 1 | 4 | 3 |
| 10 | 10 | 3 | 3.5 | 1 | 1 | 3 | 4 |
| 11 | 11 | 3 | 4 | 1.5 | 1 | 2 | 2 |
| 12 | 12 | 4.5 | 5 | 4.5 | 1 | 3 | 1 |
| 13 | 13 | 3.5 | 4 | 2.5 | 1 | 1 | 1 |
| 14 | 14 | 4 | 4 | 2.5 | 1 | 1 | 1 |
| 15 | 15 | 4.5 | 4.5 | 4.5 | 1 | 4 | 4 |

Sample Preparation for the Inks of Table 4

Ink jet inks were also prepared by mixing a premix solution with water followed by the polyurethane dispersion (PUD) resin and finally the magenta dispersion. The final ink was allowed to mix for 30 minutes. The pH, viscosity, and surface tension were obtained for each ink. The premix solution was prepared by mixing 14 parts propylene glycol, 10 parts polyethylene glycol monomethyl ether, 4 parts glycerin, 1 part Surfynol 465, 0.4 part Byk 028, and the remaining to 100 parts with water. The magenta dispersion was prepared by milling 15 parts Clariant Ink Jet Magenta E02, 24.4 parts dispersant for pigments dispersed in water, 4 parts propylene glycol, 0.1 parts Byk 028, and the remaining to 100 parts with water until the appropriate particle size was achieved.

The inks were then charged to a continuous ink supply system and jetted through an Epson C88+ printer on Ocè PSP8G paper. The final printed properties were

TABLE 4

Additional Results on Jetted Ink Jet Ink Images

| | PUD Resin | | Magenta Dispersion | Premix | Water | | Viscosity | Surface Tension | Sutherland Rub | Crock Dry ΔE | Crock Wet ΔE |
|---|---|---|---|---|---|---|---|---|---|---|---|
| Exp | Exp | g | g | g | g | pH | cP | dyne/cm | ΔE CMC | CMC | CMC |
| Ink 1 | PUD 1 | 45.0 | 106.7 | 200 | 48.3 | 9.0 | 2.6 | 31.4 | N/M | N/M | N/M |
| Ink 2 | PUD 2 | 51.4 | 106.7 | 200 | 41.9 | 8.4 | 3.5 | 34.5 | 0.2 | 1.0 | 9.1 |

TABLE 4-continued

Additional Results on Jetted Ink Jet Ink Images

| Exp | PUD Resin Exp | g | Magenta Dispersion g | Premix g | Water g | pH | Viscosity cP | Surface Tension dyne/cm | Sutherland Rub ΔE CMC | Crock Dry ΔE CMC | Crock Wet ΔE CMC |
|---|---|---|---|---|---|---|---|---|---|---|---|
| Ink 3 | PUD 3 | 22.5 | 53.3 | 100 | 24.2 | 8.0 | 3.4 | 29.0 | 0.2 | 1.1 | 0.6 |
| Ink 4 | PUD 4 | 25.9 | 53.3 | 100 | 20.7 | 8.3 | 3.2 | 31.9 | 0.6 | 1.1 | 5.1 |
| Ink 5 | PUD 5 | 25.9 | 53.3 | 100 | 20.7 | 8.5 | 3.4 | 28.1 | 0.4 | 0.6 | 20.5 |
| Ink 6 | PUD 6 | 26.6 | 53.3 | 100 | 20.1 | 8.0 | 3.3 | 33.4 | 1.3 | 2.3 | 4.9 |
| Ink 7 | PUD 7 | 26.5 | 53.3 | 100 | 20.2 | 7.6 | 3.2 | 28.5 | 0.6 | 0.6 | 3.6 |

N/M means not measured

Although only a few embodiments of this invention have been described above, it should be appreciated that many modifications can be made without departing from the spirit and scope of the invention. All such modifications can be included within the scope of the invention, which is to be limited only by the following claims.

The invention claimed is:

1. An aqueous ink jet ink composition comprising a dispersed pigment, a polyurethane resin dispersion, and if the dispersed pigment is other than a self-dispersible pigment a dispersant to aid in the dispersion of the pigment;

wherein said polyurethane resin dispersion is derived from reacting a polyisocyanate comprising a diisocyanate of formula

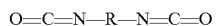

with an active-hydrogen containing compound to form a urethane polymer or prepolymer, which is subsequently dispersed into an aqueous media forming a polyurethane resin dispersion;

wherein at least 60% by weight of the polyisocyanate component incorporated into said polyurethane resin dispersion is characterized as an cycloaliphatic isocyanate because the R group includes only aliphatic moieties of 4 to 30 carbon atoms; and wherein at least 75 mole percent of said active-hydrogen containing compound comprises a polyester from 1,6-hexane diol, neopentyl glycol and adipic acid.

2. An aqueous ink jet ink composition of claim 1, wherein said diisocyanate of formula O=C=N—R—=C=O is chosen from the group consisting of H12 MDI and IPDI.

3. An aqueous ink jet ink composition of claim 1, wherein at least 85% of the diisocyanate is chosen from the group consisting of H12 MDI, IPDI, and mixtures thereof.

4. An aqueous ink jet ink composition of claim 1, wherein at least 85% of the diisocyanate is chosen from the group consisting of H12 MDI.

5. An aqueous ink jet ink composition of claim 1, wherein said polyester characterized as the polyester from 1,6-hexane diol, neopentyl glycol and adipic acid is characterized by a number average molecular weight of 500 to 10,000 Daltons.

6. An aqueous ink jet ink composition of claim 1, wherein at least 85 mole % of the active hydrogen containing compound used to form the urethane is a polyester from 1,6-hexane diol and neopentyl glycol reacted with adipic acid.

7. An aqueous ink jet ink composition of claim 1, wherein the polyurethane resin is chain extended with a di-functional or higher amine with solubility in the continuous water phase of at least 20 grams per liter.

8. An aqueous ink jet ink composition of claim 7 wherein said di-functional amine or higher amine selected from the group consisting of:
a) alkylene diamines
b) hydrazine
c) amino ethanol amines and
d) mixtures thereof.

9. An ink jet printed image on a photograph, rolled textile product or garment wherein the image is generated with ink jet comprising an aqueous ink jet ink composition according to claim 1.

10. An ink jet printed image on a synthetic polymer in the form of a film, woven or nonwoven substrate wherein the image was generated by digitally jetting an ink jet ink composition according to claim 1.

11. An ink jet printed image on advertising in the form of a banner, sign, billboard, or point of purchase advertising wherein the image was generated by digitally jetting an ink jet composition ink according to claim 1.

12. An ink jet ink composition according to claim 1, wherein said pigment or dye is from 2 to 10 wt. % of said composition, said polyurethane or urethane prepolymer is from 5 to 30 wt. % of said composition, and water is from 20 to 70 wt. % of said composition.

* * * * *